Figure 1A:
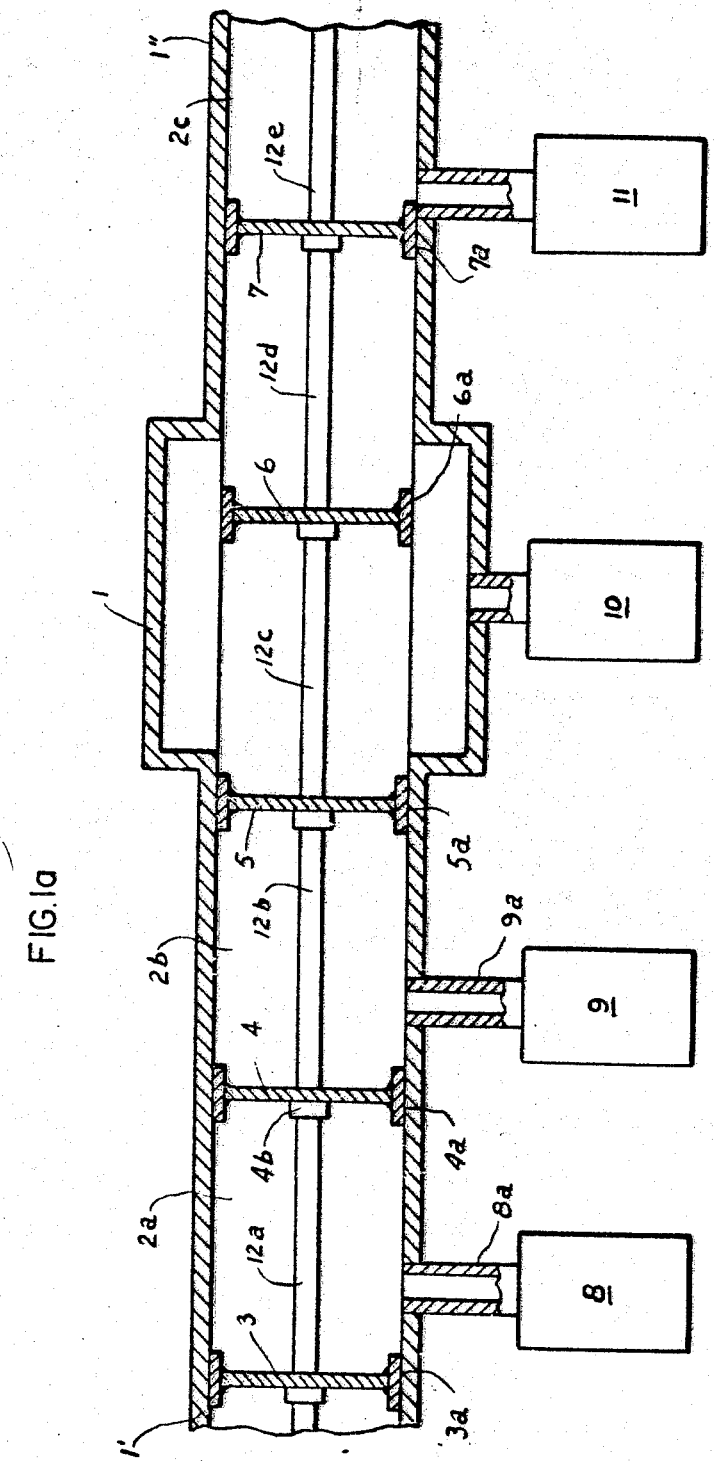

United States Patent [19]
Steigerwald

[11] 3,756,435
[45] Sept. 4, 1973

[54] PRESSURE LOCK SYSTEM FOR A CHAMBER

[75] Inventor: Karl-Heinz Steigerwald, Starnberg, Germany

[73] Assignee: Steigerwald Strahltechnik GmbH, Munchen, Germany

[22] Filed: June 10, 1971

[21] Appl. No.: 151,757

[30] Foreign Application Priority Data
June 11, 1970   Germany.................. P 20 28 862.4

[52] U.S. Cl. ........................... 214/17 B, 34/242
[51] Int. Cl. ............................................... B65g 65/30
[58] Field of Search ................ 214/17 B, 26, 17; 34/242

[56] References Cited
UNITED STATES PATENTS

| | | | |
|---|---|---|---|
| 3,314,873 | 4/1967 | Lunsford | 214/17 B X |
| 2,405,077 | 7/1946 | Vonder Heide | 214/17 B |
| 2,227,749 | 1/1941 | Gooder | 214/17 B X |
| 2,924,343 | 2/1960 | Isven | 214/16 B |
| 3,128,963 | 4/1964 | Erkes | 214/17 B X |

FOREIGN PATENTS OR APPLICATIONS
1,157,820   11/1963   Germany........................ 214/17 B

*Primary Examiner*—Robert G. Sheridan
*Attorney*—Sandoe, Hopgood & Calimafde

[57] ABSTRACT

A pressure lock system for introducing workpieces successively into and out of a high vacuum work chamber, comprising inlet and outlet lock channels communicating with said chamber through which a series of workpiece support elements comprising piston-like sealing elements connected in spaced relation by intermediate elements are moved as a chain, either continuously or intermittently. If desired, any workpiece supporting element within the chamber may be detached from the chain and moved in various directions within the chamber while work is performed on the workpiece.

11 Claims, 10 Drawing Figures

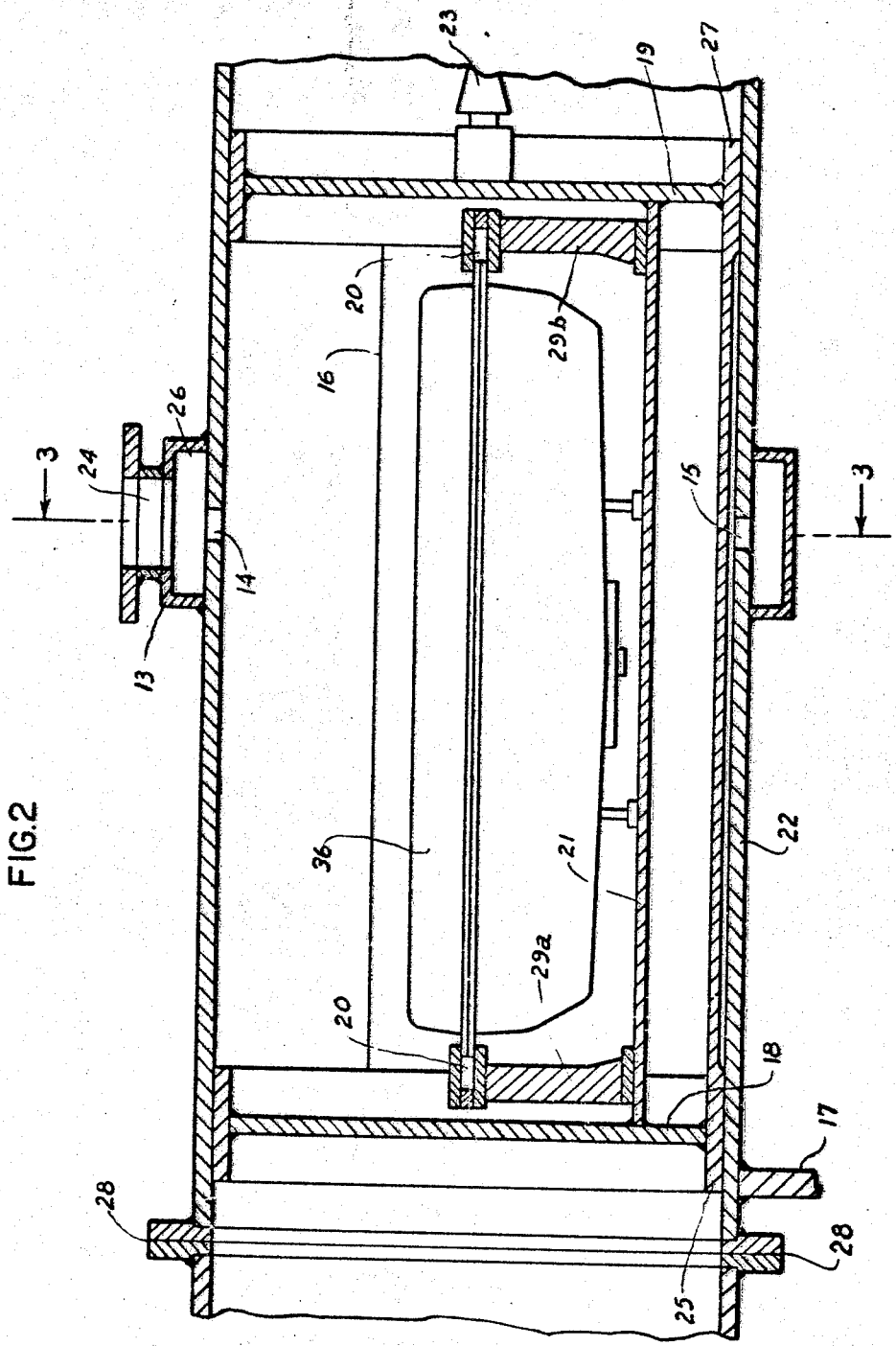

PRESSURE LOCK SYSTEM FOR A CHAMBER

The present invention relates to a pressure lock system for a chamber in which a pressure different from the surrounding pressure prevails, and in particular a pressure lock system for the introduction into, and removal of workpieces from, a high-vacuum work chamber of a processing machine operating with beams of charge carriers.

In numerous industrial processes, fluids or solids to be treated must be brought temporarily into working chambers in which very low pressures of, for example, the order of magnitude of $10^{-4}$ or $10^{-6}$ mmHg are produced. Such operations in themselves do not afford any particular difficulties as long as individual specimens are concerned and furthermore sufficient time is available to evacuate the work chamber after each individual machining.

Frequently, however, it is desired to treat or machine objects or workpieces in large numbers one after the other in chambers in which a pressure differing from the surrounding pressure prevails, and in particular in high-vacuum working chambers. In such quantity operations it is normally highly desirable for the time between successive machinings or treatments to be as short as possible. This is particularly true when the actual machining or treatment apparatus is costly or expensive and should take place insofar as possible without any pauses in operation. In such circumstances, furthermore, the articles should be introduced into the chamber one after another and removed again from it one after another without substantial change in the working pressure prevailing in the work chamber. One such case exists, for instance, in connection with the machining or treatment of workpieces in a high-vacuum work chamber of a treatment or processing machine operating with beams of charge carriers, for instance in an electron-beam machine tool.

Pressure lock systems for the introduction of workpieces into a vacuum chamber and their removal therefrom are already known. Such systems operate, for instances, with rotatable or reciprocatable tables having a plurality of workpiece holders which, upon movement of the table, are brought in succession into a loading station, a working station located within the vacuum chamber, and a discharging station. Pump means are provided at least in the loading station or between the loading station and the vacuum chamber in order to bring the pressure in the atmosphere surrounding the workpiece to the level of the pressure prevailing in the chamber.

One known device for the charging of a vacuum chamber which acts in this manner and serves for the introduction and removal of a large number of articles consists essentially of a cylindrical bar-shaped structure which is provided over a part of its length with a plurality of recesses, in the form of transverse grooves, for example. These recesses are preferably spaced apart at regular distances from each other and are adapted to receive articles which are to be treated or machined in the vacuum chamber. The bar can be pushed as a unit through openings in the walls of the vacuum chamber, packings such as elastic annular gaskets which form a sliding seal with the bar being provided at the corresponding openings in the walls. Furthermore, this bar can extend through a pre-chamber which is arranged ahead of the vacuum chamber. This chamber can also be evacuated to a certain extent, and is provided in its turn with a seal at the opening in the wall thereof facing the outside. In the case of this known device, in order to introduce the articles into the vacuum chamber, the bar-shaped structure is first of all pulled out from the vacuum chamber on one side far enough to that the recesses therein are located outside the chamber as well as outside the pre-chamber, and so that the articles can be inserted into the recesses. Thereupon the articles can be introduced into the pre-chamber and then into the vacuum chamber by suitable movement of the bar without substantially reducing the vacuum which has been produced in the vacuum chamber.

In actual practice it has, however, been found that the known devices are not satisfactory since the number of articles which can be handled is limited. Furthermore considerable difficulties occur in the case of articles having relatively large dimensions. Furthermore, the known devices constitute a rigid system which is not directly suitable for continuous, for instance, cyclical, and particularly automated, operations. Finally, considerable difficulties also occur with regard to the vacuum seals at the insertion openings.

There is furthermore known a pressure lock system for the introduction and removal of plate-shaped workpieces of the same and similar shapes. In this system one inlet lock channel and one outlet lock channel are provided. In each of the lock channels there is provided a conveyor device, this conveyor device consisting of rotating endless toothed conveyor belts the points of reversal of which lie outside and inside the vacuum chamber, respectively. The workpieces to be machined are inserted outside the vacuum chamber into the toothings of the conveyor belts and are removed from said toothings within the vacuum chamber. Pumping devices are connected to the lock channels, spaced from each other and from the vacuum chamber, so as to result in a pressure-stage system. The sealing between the individual stages of the pressure-stage system is effected by the workpieces themselves as they are transported through the lock channels, the portions of the outer rim of the workpieces forming a sort of sliding seal with the inner wall of the lock channel, and by the sealing action of the parts of the conveyor chains sliding on each other, the workpieces and the other sections of the walls of the corresponding lock channel. The workpieces themselves therefore serve at least in part as sealing element of the lock system.

In the known system which was last described it it, however, difficult to assure adequate sealing effect between the individual lock chambers and the vacuum operating chamber since it is difficult dependably to seal the places of contact between the workpieces and the conveyor belts as well as the slide surfaces and points of contact between the conveyor belts and the lock channels in case of lengthy operation. This is particularly true of the transition regions between those parts of the rims of the workpieces which are in direct sealing relationship with the inner wall of the lock channel and the adjoining circumferential regions of the workpieces which are in engagement with the tubings or recesses of the conveyor belts. In addition to this there is the further disadvantage of the known arrangement that it is suitable only for workpieces whose dimensions correspond both to the circumferential shape of the lock channel and to the shape of the recesses or tooth gaps of the conveyor belts with reasonably high accuracy.

The present invention has as its object to create a pressure lock system which is suitable for handling large quantities of articles or workpieces and which operates to provide dependable sealing in continuous operation and under all operating conditions, including extreme operating pressures, such as are necessary, for instance, in the vacuum working chamber of a machine tool operating with beams of charge carriers. In addition to this, the system of the present invention is also to be capable of use with workpieces of different dimensions and shapes.

In accordance with the invention, in order to achieve the purpose in view, a pressure lock system of the type indicated above is used, having at least one inlet lock channel and one outlet lock channel through which sealing elements can be introduced and discharged respectively. Said sealing elements are spaced one behind the other, the outer circumferences of said sealing elements being in sealing relationship with the inner walls of the lock channels and forming between successive sealing elements at least partially sealed off intermediate spaces. At least one conveyor device is provided for advancing the sealing elements through the lock channels, and at least one lock-channel pumping device is provided which is connected to the inlet lock channel spaced from the working chamber. The system is characterized by the fact that the sealing elements have a circumferential shape corresponding to the inside shape of the lock channel and enter into sealing contact over their entire periphery with the inner surface of the lock channel.

In the pressure lock system of the invention the sealing between the sealing elements and the lock channels is extremely simple and reliable since it extends continuously around the entire periphery of the sealing elements and is not interrupted by other parts of a system, for instance conveyor belts, which in their turn would require special sealing measures.

In the system of the invention the sealing elements are preferably connected by intermediate elements which form a chain and hold the sealing elements apart from each other in spaced relation. Thus it is not necessary to secure spacings between the sealing elements by means of a conveyor device extending through the entire lock channel, but it is sufficient to arrange a conveyor device outside the lock channel. In this way problems inherent in the sealing of a conveyor device with respect to the lock channel are eliminated. Furthermore, the intermediate elements can also easily be so constructed that they retain their dimensions even under the influence of large differences in pressure; in contradistinction to this, in the known device which has been described above in which endless conveyor belts extend through the entire lock channel, considerable difficulties are to be expected specifically in view of this requirement of dimensional stability, since the conveyor belts must necessarily exhibit a certain flexibility.

The pressure lock system in accordance with the invention is furthermore preferably made in such manner the the sealing elements and/or their intermediate elements serve as supporting elements for the workpieces to be machined. Such a supporting element can be provided with a workpiece holding device provided with adjustable clamping elements. Furthermore, the supporting element can have a cup to receive a workpiece which is to be machined and/or to receive waste material produced during the machining. Since, therefore, the sealing element, rather than the workpiece itself, has a circumferential shape corresponding to the cross-sectional shape of the lock channel, the pressure lock system of the invention is suitable for workpieces of very different shapes. The sealing elements which are constantly reused can be shaped exclusively with respect to the sealing function which is to be exercised by them. Thus, for example, the sealing elements can be constructed in substantially piston shape. This is preferred, particularly to satisfy the requirement of good sealing. In the case of the vacuum-pressure lock systems which are of primary interest, the very strong sealing action resulting from the narrow gap between the piston-shaped sealing element and the inner surface of the lock channel will by itself frequently assure a sufficient seal. However, the piston-shaped sealing elements can also have additional annular seals which cooperate to form a seal with the inner surface of the lock channel. Such annular seals can, for instance, be constructed as lip ring seals. However, it is also possible, and in many cases advantageous, to use annular seals of material of dimensional stability, and particularly of metal. Such annular seals have long been customary in the form of piston rings of reciprocating internal combustion engines. For the centering of the sealing elements upon entrance into the inlet lock channel, such annular seals of dimensionally stable material can, in accordance with the invention, be provided with run-on bevels.

For the centering of the sealing elements, other devices can also be employed in accordance with the invention. Thus in particular the sealing elements can be provided with supporting rollers which are adjustable for the centering of the sealing elements in the lock channel. Another advantageous improvement can consist in adjustably holding the supporting rollers under spring tension in the supporting direction. The pressure lock system of the invention can, however, also be so constructed that means for the precentering of the sealing elements to be introduced into the inlet lock channel are provided in the entrance region of the inlet lock channel.

One particularly advantageous embodiment of the pressure lock system of the invention includes the provision of means for conveying the sealing elements individually or in groups back from the outlet to the entrance of the lock system. In this way there is obtained a circulating system which is particularly well suited for many applications.

The conveyor device of the pressure lock system of the invention can be constructed in various ways and can be set up as advisable in any specific case, for instance, for continuous of for intermittent advance of the workpieces. As already stated, one fundamental advantage of the pressure lock system of the invention is that the conveyor device and similar devices can be arranged outside the lock elements. For example, one advantageous embodiment is characterized by the fact that it has at least at one end an adjusting device, preferably with at least one hydraulic cylinder, to advance a chain formed of sealing elements and connecting elements and/or to take up the differential pressure force acting on the chain. A corresponding adjusting device can be provided also at the other end of the pressure lock system. In this connection the use of hydraulic cylinders is very advantageous since large forces can be exercised with them in a manner which can be accurately controlled.

The said support elements for receiving workpieces to be treated or machined can be shaped in the most varied manners depending on the existing shapes of the workpieces and other requirements. Thus a particularly simple support element in accordance with the invention can comprise merely one sealing element and an intermediate element rigidly connected with it.

Particularly diversified possibilities of control and machining result in accordance with the invention when the support elements are connected to form a chain by detachable connections. This can be achieved in a simple manner, according to the invention, by providing intermediate elements which are connected with at least one of the adjacent sealing elements by a detachable connection. Another embodiment which results in a particularly dependable guiding of the supporting elements in the lock channel is characterized by the fact that the supporting element has a pair of consecutive sealing elements which are rigidly connected with each other by an intermediate element and that between the pairs there are provided intermediate elements which are connected at at least one end via a detachable connection with the adjacent sealing element. Remote control or automated control can be obtained in accordance with the invention by the fact that the detachable connection has a clutch which is actuatable by clutch control means. In this connection it may in particular be advantageous that the clutch control means is actuatable by movement of a support element. The clutch control means is preferably of such a nature and/or so arranged in accordance with the invention that a support element which has entered the chamber is released from the chain of support elements so that it can be moved in any desired manner during the machining in the chamber, for instance by movement devices provided for this purpose.

Another advantage of the pressure lock system of the invention is characterized by the fact that at least a part of the connections present in the chain of sealing elements and intermediate elements are articulated. This makes possible not only a better adaptation to any irregularities in the course of the lock channels but also the passage through curved lock channels.

In the following description illustrative embodiments of the invention will be described in further detail read in conjunction with the drawings, and in which connection all details distinguishing from the prior art may be of essential importance for the invention.

Figure 1B:
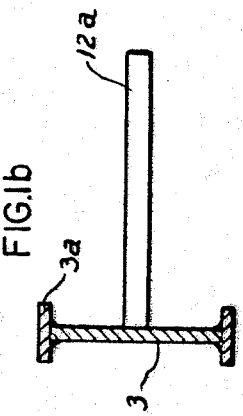
Figure 3:
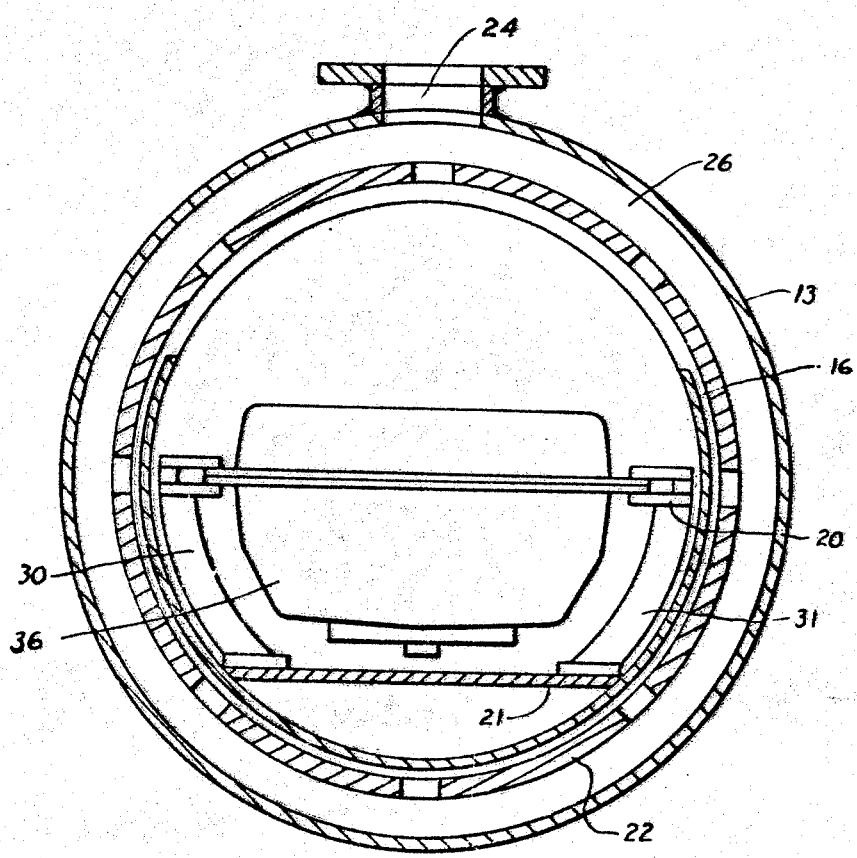
Figure 4:
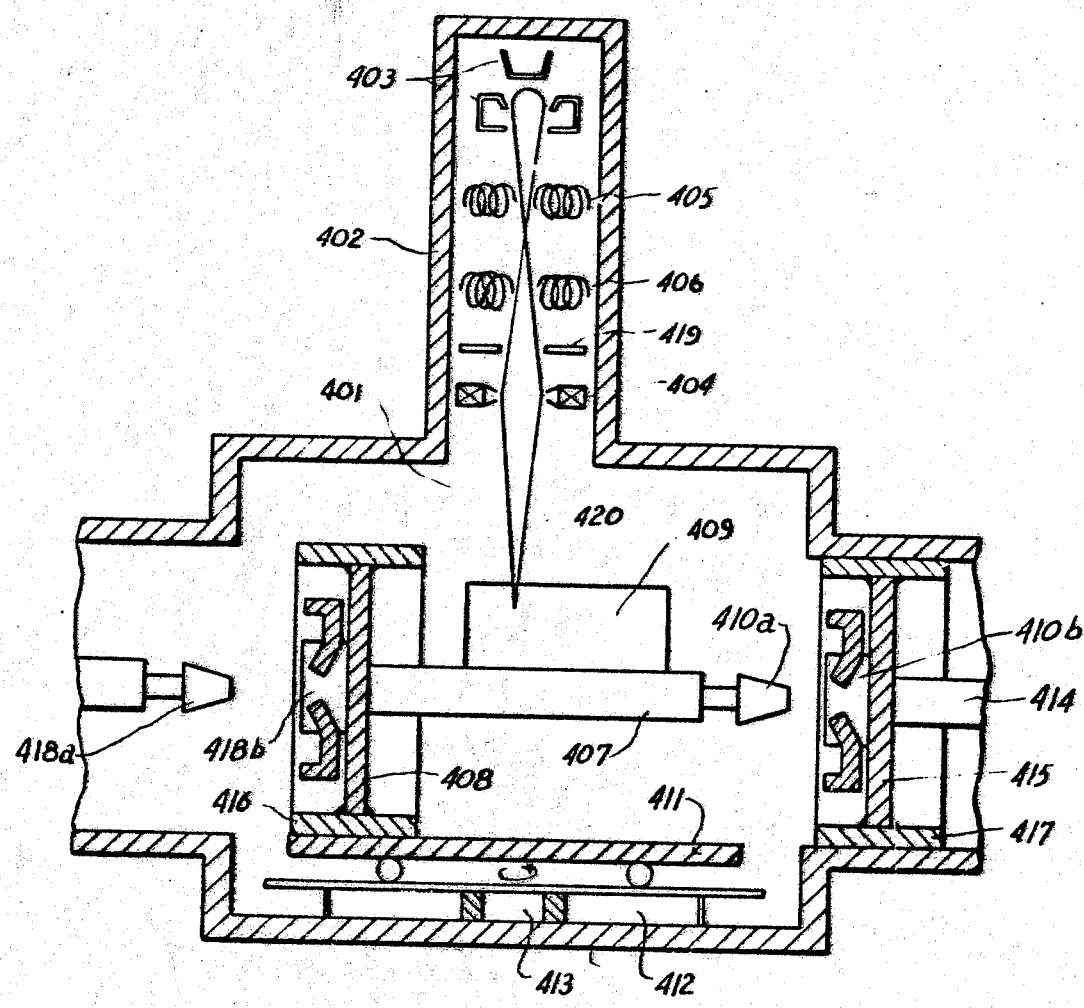
Figure 5:
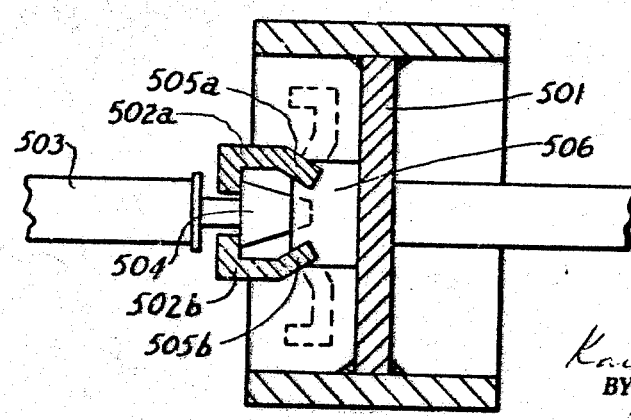

In the drawing:

FIG. 1a is a simplified schematic longitudinal section through a pressure lock system, FIG. 1b is a schematic longitudinal section through a particularly simple embodiment of an individual support element, FIG. 2 is a schematic longitudinal section through another embodiment of a support element contained within a lock channel and bearing a workpiece which is to be machined by electron-beam welding in a high-vacuum chamber, FIG. 3 is a schematic cross-section through the support element on the line 3—3 of FIG. 2, FIG. 4 is a schematic section through the work chamber of an electron-beam welding machine which is provided with a pressure lock system, FIG. 5 is a schematic section through a clutch mechanism connecting two successive support elements.

Figure 6:
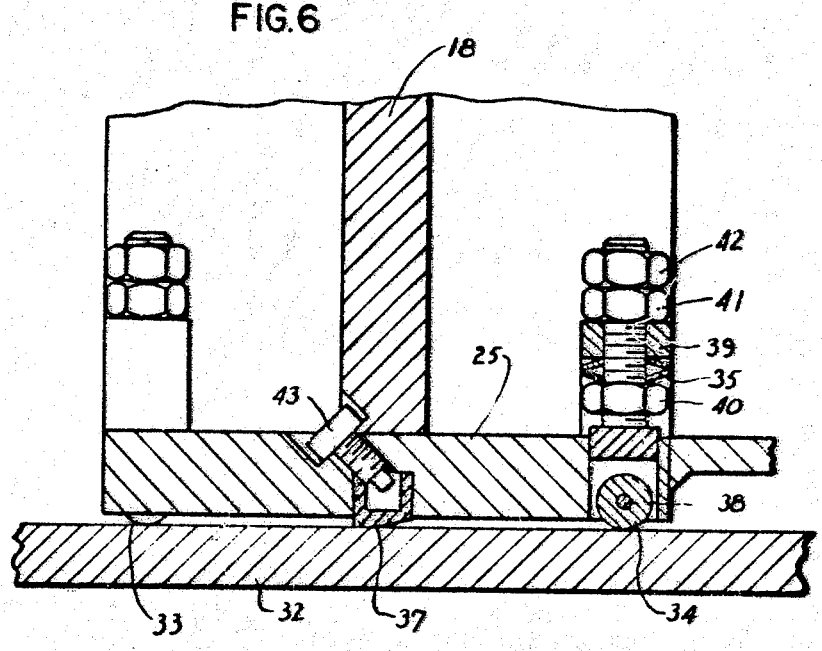
Figure 7:
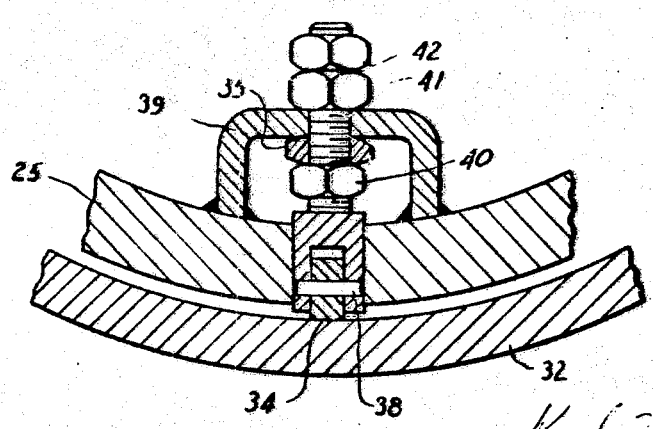
Figure 8:
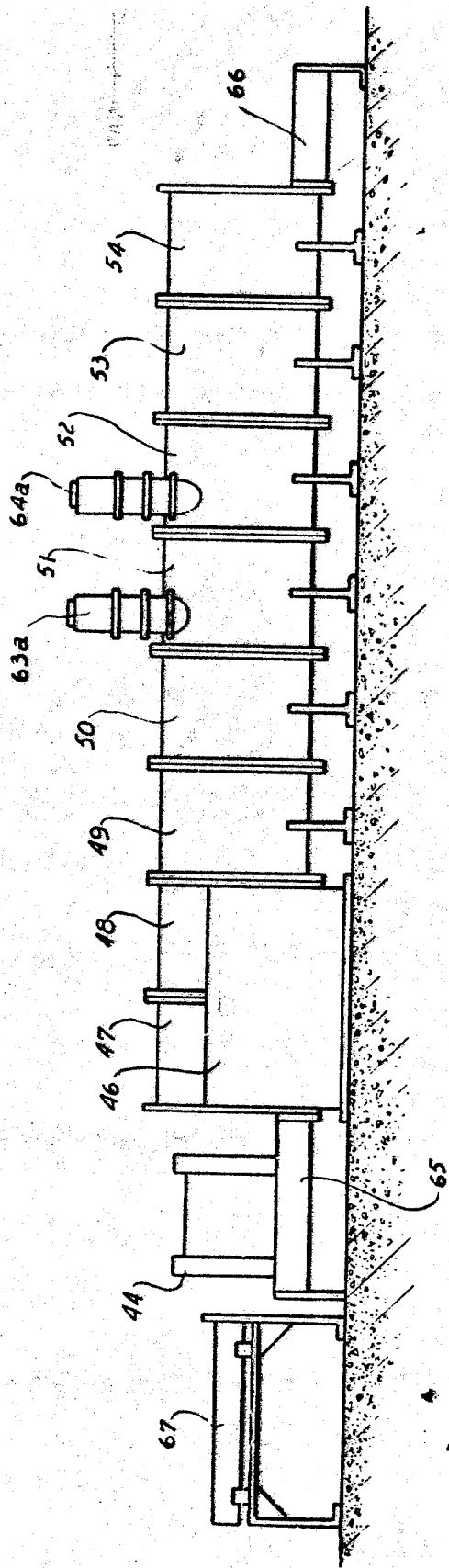
Figure 9:
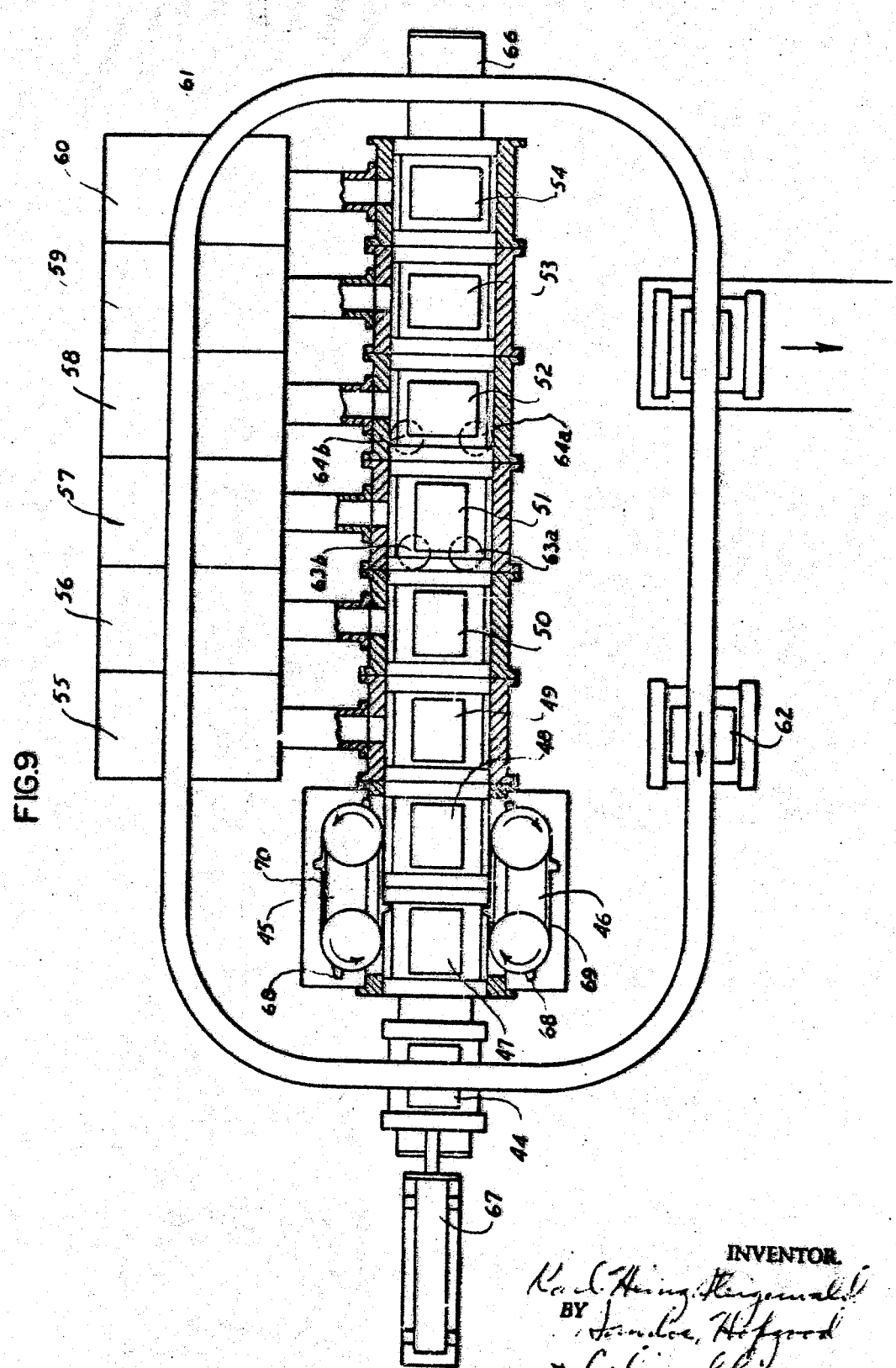

FIG. 6 is a partial longitudinal section through an embodiment of a sealing element in accordance with the invention, FIG. 7 is a partial cross-section through the part of the sealing element shown lying on the right in the FIG. 6, FIG. 8 is a schematic side view of a pressure lock system, and FIG. 9 is a schematic top view of the pressure lock system shown in FIG. 8 as intended for an electron-beam welding plant with fully automatic, continuous operation.

The pressure lock system shown schematically in FIG. 1a includes a vacuum working chamber 1 which has a shape corresponding to the specific requirements of the intended operation. For example, it may be cylindrical. By means of a vacuum pump 10 connected to the vacuum working chamber 1, any desired vacuum, for instance a vacuum of $10^{-2}$ mmHg, can be established within the chamber 1.

The chamber 1 is connected at its two ends to an entrance lock channel 1' and a discharge lock channel 1'', respectively, which may be constructed, for instance, as cylindrical pipe lengths. In the case of the illustrative embodiment shown, they form, jointly with the chamber 1, a passageway for workpieces to be machined.

Through the path defined by the lock channels 1', 1'' and the vacuum working chamber 1, a number of sealing elements 3, 4, 5, 6, 7 spaced at predetermined distances are transported. These sealing elements each have a circumferential shape corresponding to the inside profile of the lock channels and are in sealing engagement with the inner wall of the lock channels 1', 1'' throughout their entire circumference. In the case of the embodiment shown in FIG. 1, the sealing elements 3–7 are provided at their circumferences with piston rings 3a–7a. Vacuum pumps 8, 9 are connected via connections 8a, 9a with the entrance lock channel 1'. Additional pumps 10, 11 are connected to the vacuum working chamber 1 and to the discharge lock channel 1'' respectively. It can be seen that the intermediate spaces 2a and 2b between the sealing elements 3, 4, 5 present in the entrance lock channel 1' together with the pumps 8, 9 which are at a corresponding distance from each other and from the vacuum working chamber, form a pressure-stage system in which two lock elements are connected behind each other. In the outlet lock channel 1'' only one pump 11 is shown; here therefore only a single lock element is present which is formed by the intermediate space 2c in the case of the operating condition shown, it being self-evident that the outlet lock channel 1'' extends, in accordance with the FIG. 1, towards the right at least far enough so that the distance between its outlet end and the connection with the pump 11 is somewhat greater than the distance between two sealing elements.

It can be readily seen that in principle it would be sufficient to use on the inlet lock channel 1' only a single pump and no pump at all at the outlet lock channel; this, however, would make a correspondingly good seal necessary between the sealing elements and the inner wall of the lock channels 1' and 1''. In general, one will, therefore, use several pumps at the inlet lock channel 1' and therefore develop the inlet pressure lock in the manner described as pressure-stage path, and use on the outlet lock channel 1'' at least one pump in order to keep the admission of air into the vacuum working chamber 1 as small as possible.

The seal between the sealing elements 3, 4, 5, 6, 7 and the inner wall of the lock channels 1', 1'' is of better or poorer quality, depending on the embodiment selected. In many cases, particularly when using a pressure-stage path of the types of the pressure stage described with the pumps 8 and 9, it will be sufficient if the sealing elements are fitted sufficiently accurately to the inner cross-section of the lock channels and are sufficiently long axially at their periphery so that the resistance to flow of the gap formed between the periphery of the sealing element and the inner wall of the lock channel is sufficiently large to keep the leakage flow so small that it can be pumped off by the pumps of the pressure-stage path. Preferably, the sealing elements shown in FIG. 1 are provided at their periphery with piston rings 3a, 4a, 5a, 6a, 7a and are, therefore, constructed in piston-like manner. Furthermore, of course, additional sealing measures can be provided on the periphery of the sealing elements, for instance the piston rings 3a, 4a, 5a, 6a, 7a can also be provided with additional elastic annular packings. The length of each piston ring 3a–7a, and therefore its dimension in axial direction, is such that it is greater than the largest diameter of a connection leading to the vacuum pumps 8, 9, 11. In this way an undesired connecting of the two intermediate spaces present in front of and behind the sealing element in question is prevented when a sealing element passes a pump connection.

The sealing elements 3–7 are connected with each other by intermediate elements 12a, 12b, 12c, 12d, 12e to form a chain. In the embodiment shown in FIG. 1a, each intermediate element is rigidly connected at its left end (as seen in FIG. 1) with a corresponding sealing element, while the righthand end is connected via a coupling 4b, preferably detachably and/or in articulated manner, with the corresponding sealing element.

In FIG. 1b there is separately shown one such intermediate element 12a with the sealing element 3 rigidly fastened to it.

The intermediate elements and the sealing elements may be provided with holding devices for workpieces which are to be machined in the vacuum work chamber 1. For example, each intermediate element may simply have a horizontal supporting surface for a workpiece which is to be machined. In the embodiment shown in FIGS. 1a and 1b, each pair consisting of a sealing element and the intermediate element rigidly connected with it forms a support element for the workpieces to be machined.

The sealing elements and the intermediate elements which determine their distances from each other are advisedly so dimensioned in axial direction or the direction of transport that the distance between the sealing circumferences of two successive sealing elements (for instance the distance between the piston rings 3a and 4a in the case of the embodiment shown schematically in FIG. 1a) is less than the distance between two successive pump connections (for instance between the pump connections 8a and 9a). In this way, during the movement of the chain formed of sealing and intermediate elements, there is no direct connection between two pump connections at any time.

In operation, a vacuum which is suitable for the desired purpose is produced in the vacuum working chamber 1 by means of the vacuum pump 10. Thus, there can be arranged in the vacuum working chamber an electron-beam welding device with which welding operations are carried out on a series of workpieces, each of which is arranged on a support element consisting of a sealing element and the intermediate element firmly connected therewith. For this a pressure of the order of magnitude of at most $10^{-2}$ mmHg is maintained in the vacuum working chamber 1. Such a high vacuum or even a better one can be continuously maintained during the introduction and removal of the workpieces as a result of the pressure lock system described. Therefore, since it is not necessary to evacuate the working chamber 1 prior to each machining operation, the speed of working is correspondingly high.

For example, with a system in accordance with FIG. 1a having two pressure stages in the entrance lock channel 1', the pressure in the first space 2a can be reduced by means of the pump 8 from atmospheric pressure to about 10 mmHg and the pressure can then be reduced further in the second space 2b by the pump 9 to about 0.1 mm Hg.

The power of the pump 10 connected to the working chamber 1 can then readily be so adjusted that a desired low pressure of, for instance, the order of magnitude of 0.01 mmHg can be continuously maintained in the work chamber.

The number of pumping devices and the required pumping power of the pumps provided in the outlet lock channel 1'' depends, as already indicated above, primarily on the tightness of the seal between the sealing element and the inner wall of the outlet lock channel or, stated differently, on the permissible leakage flow through the outlet lock channel 1'' to the vacuum working chamber 1.

Since FIG. 1a serves primarily to explain the basic construction and the manner of operation of a simple embodiment of of the invention, all accessory parts of the plant have been omitted from the drawing. For example, the conveyor device for the advancing of the chain of sealing and intermediate elements, the workpiece loading and unloading stations on the inlet and outlet ends, have been omitted. Such stations can be provided, for instance, with hydraulically actuated, and preferably automatically controllable, servomotors and additional throttle stages lying in front of the inlet and outlet of the pressure lock system, which throttle stages may be advisable in special cases for the further prevention of leakage.

Another embodiment of the invention is shown schematically in FIGS. 2 and 3. In this embodiment each support element for workpieces to be machined consists of two successive sealing elements 18, 19 which are rigidly connected with each other by a semicylindrical intermediate element 16 having a circumferential shape which corresponds to the inside profile of a lock channel 22. In FIGS. 2 and 3 there is shown a section of a lock channel of circular cross-section and the circumferences of the sealing elements 18, 19 are again provided with piston rings 25, 27 in order to obtain a better seal with respect to the inner wall of the lock channel 22. The piston rings can seal either solely due to their sliding fit in the lock channel or else they may be provided with additional sealing aids, for instance elastic annular packings similar to the piston rings customary in piston-type internal combustion engines.

In FIGS. 2 and 3 the support element consisting of the sealing elements 18 and 19 as well as the intermediate element 16 is shown at a place in the lock channel 22 where a pump connection 24 for a vacuum pump is provided. The pump connection 24 is connected via an annular chamber surrounding the lock channel 22 and openings 14, 15 with the inside of the lock channel 22. Accordingly, in the position shown, the space between the sealing elements 18 and 19 can be evacuated via the pump connection 24.

The section of the lock channel 22 thus shown forms a lock element in which the operation described in connection with FIG. 1a can be performed. For example, a section of suitable length leading directly to a vacuum work chamber (not shown) can adjoin the lock-channel section shown at the right hand end of FIG. 2, and the left hand end of the lock-channel section shown can be continued by a section (not shown) which is also provided with a pump connection and forms a further lock element.

The lock channel is preferably formed of an assembly of several parts. In FIG. 2 on the left a connecting joint 28 between two such parts is shown. It will frequently be advisable to form the lock channel of parts which are identical to each other, each of which, for instance, has a pump connection and is sufficiently long to form a lock element.

In the embodiment shown in FIGS. 2 and 3, the semi-cylindrical intermediate elements 16 which rigidly connect together pairs of successive sealing elements 18, 19 constitute cups to receive workpieces which are to be machined. Furthermore, any waste products, for instance atomized material or material of the workpiece which has dripped off therefrom, is collected in said cups. The cup-shaped intermediate element 16 has a horizontal intermediate bottom 21 on which a workpiece holder comprising posts 29a and 29b (FIG. 2) or 30 and 31 (FIG. 3) is supported. Clamping elements 20, displaceable via slots are mounted on said posts to support a workpiece 36. In FIGS. 2 and 3 the workpiece comprises two container parts, which are to be welded together in the vacuum working chamber (not shown in FIGS. 2 and 3) to form a container, in which connection a welding method which operates in particular with electron beams is to be used. In order to form a chain of support elements, the rigidly interconnected pairs of sealing elements 18, 19 are connected with each other in the embodiment shown in FIGS. 2 and 3 by further intermediate or connecting elements 23, preferably with the use of an electromagnetically actuatable clutch, one embodiment of which will be described in further detail hereinafter.

In certain cases it may be necessary to separate the support element which is contained within the work chamber from the chain of successive support elements temporarily, for instance in those cases in which the support element is to move freely within the work chamber in different directions for purposes of machining.

For this purpose it is necessary to separate the support elements adjoining the two ends of the support element present in the chamber from the latter and preferably move same away by a certain amount in axial direction. Thus, it may be desired to move the support elements coming from the entrance side backwards in a direction opposite the direction of conveyance, and to advance the support elements lying on the outlet side and which have already been passed through the chamber by a corresponding amount in the direction of conveyance, as will be explained further hereinafter with reference to FIG. 4. Since, however, atmospheric pressure acts on the inlet-side and outlet-side support elements both through the inlet opening and through the outlet opening, special steps must be taken to carry out these measures. Such steps can, for instance, consist in providing both at the inlet side and at the outlet side of the pressure lock system of the invention additional devices which make it possible for the required pulling forces to act on the partial chains of the support elements in correspondingly opposite axial direction.

Furthermore, the support elements must be connected together in force-locked manner in order to be able to transmit the pulling forces in each case to all support elements arranged in a partial chain.

FIG. 4 shows a schematic sectional view of a vacuum working chamber 401 of an electron-beam welding machine, in which connection there is arranged on the top of the work chamber 401 an evacuatable housing 402 connected via an opening with the chamber 401, said housing containing an electron-beam generating system 403 consisting essentially of cathode, Wehnelt electrode and anode. Below the electron-beam generating system 403 there are provided adjusting coils 405 and 406 which are followed by a diaphragm 419 and, below same, a magnetic focusing lens 404 for forming a sharply focused electron beam 420. The further details of the construction and manner of operation of such an electron-beam gun for welding machines are well known in the art and have not been shown in FIG. 4.

Let us now assume that the work chamber 401 which can be evacuated through a pump connection (not shown) continuously to a pressure of 0.01 mmHg is connected with a pressure lock system which is developed in accordance with the invention and the lock channels of which may be developed approximately in accordance with the arrangement shown in FIG. 1. The pipe connections on the chamber 401 indicated in FIG. 4 correspond to this. Furthermore, let us assume that the support elements are constructed corresponding to the embodiment shown in FIG. 1b.

FIG. 4 shows an operating condition in which such a support element 407 is located within the work chamber 401. On its end it has a piston-shaped sealing element 408 with piston ring 416 and it is loaded with a workpiece 409 onto which the electron beam 420 is caused to act, thus machining it. The support element 407 may be separated in the position shown in FIG. 4 by disengaging the parts 410a, 410b and 418a, 418b respectively, which constitute electromagnetic clutches associated with the end faces of adjoining support elements. The separated support element is then supported on a movement device which is provided in the work chamber 401 and which serves for the further transportation of the support element and workpiece inside the work chamber 401 during the machining. Details of a movement device are described hereinafter. In the outlet lock channel (to the right in FIG. 4) there is shown a support element 414 which has been disconnected from the support element 407 and the sealing element 415 of which also has a piston ring 417.

It will be understood that means are provided at each of the inlet and outlet sides of the pressure lock system associated with the work chamber 401 for adjusting the positions of the support elements contained in the outermost lock stages. By means of these adjusting devices the necessary pulling forces can be applied to the chains of support-elements which have been separated from the support element 407 located in the chamber 401 in order to assure a complete release of the support element 407 for the duration of the machining.

Each of the adjusting means rpeferably includes at least one hydraulic cylinder as an actuating member. Such hydraulic cylinders can also be used for the further advancing of the chains of support elements. They may preferably be connected to the end support elements by electromagnetic clutches.

The aforementioned movement device in the work chamber 401 permits the simultaneous horizontal movement of the support element 407 supported by it in the x and y directions, as well as simultaneous rotation around a vertical axis during the machining of the workpiece by the beam of electrons 420. This movement device consists essentially of a carriage 411 for transporting the support element 407 in the x direction, said carriage 411 being mounted on a carriage 412 for transporting the support element in the y direction. A turning device 413 permits rotation of the entire movement device around the z axis. If necessary, such a movement device may also include means to permit rotation around a horizontal axis.

The details of the electromagnetic clutches associated with the ends of the support elements are shown in FIG. 5. The moving jaws 502a, 502b of these clutches are arranged in each case on the outside of the sealing element 501 of a support element. In the present example the moving jaws 502a, 502b, cooperate with a conically shaped coupling part 504 at the end of the intermediate element 503 adjacent to it in axial direction. FIG. 5 shows how the jaws 502a, 502b of the jaw clutch which are pivoted on a mount 506 engage the rear face of the conical part 504. In the position shown in broken lines, the jaws 502a, 502b have been opened by causing them to swing back around their respective axes 505a, 505b. The actuating of the jaws 502a, 502b can be effected electromagnetically, and tension springs or the like, not shown in FIG. 5, can also be used. It will be understood that the coupling shown produces a connection which is articulated at least to a limited extent.

The supplying of current to the electromagnetic system of the jaw clutch is effected, for example, by electric wiper contacts which may be arranged on the support element, for instance in the vicinity of the circumferential surface of a sealing element. In this connection stationary contacts cooperating with these wiper contacts can be provided within the work chamber 401. By such or similar measures, an automatic disconnecting of the support element 407 introduced in each case into the work chamber 401 from the chain of support elements can be effected, in which connection the stationary contact means can lie preferably at places located in the region of the entrance side of the chamber 401. By the substantially simultaneous actuation of the aforementioned hydraulic cylinders on the inlet and outlet sides, the complete release of the support element 407 is then effected within the work chamber 401. After completion of a machining process, the support element partial chains on the inlet and outlet sides are brought by suitable actuation of the corresponding hydraulic cylinders back into connection on both sides with the support element 407, in which connection the coupling mechanisms can be caused to lock with each other, for instance merely by pushing the parts 418a, 418b and 410a, 410b respectively into each other. Thereupon there takes place the further advance of the chain of support elements through the pressure lock system of the invention until the next support element has entered the work chamber 401.

FIGS. 6 and 7 show in detail advantageous embodiments of the piston ring of a sealing element directly adjacent the wall of a lock element. The purpose of such a piston ring is, inter alia, on the one hand to assure optimum sealing of the sealing elements with respect to the inner wall of the lock channel and on the other hand to assure the easiest possible movement of the sealing element within the lock channel. In FIG. 6 there is shown in axial section a part of a sealing element 18 with piston ring 25, which part is directly adjacent a wall 32 of a lock channel. A corresponding cross-section is shown in FIG. 7.

The central part of the piston ring 25 carries a piston ring packing 37 which contacts the wall 32 and is formed of dimensionally stable, resilient material, for instance steel, which is secured within a groove by means of a fastening element 43 against springing out in unstressed condition. This packing 37 has an oblique run-on surface forming an acute angle with the wall 32, and is so constructed that it can slide on the inner surface of the wall 32 upon the operation of the pressure lock system of the invention. Supporting rollers 33 and 34 which are carried on axles 38 in the piston ring 25 assure sufficient mobility of the piston ring 25 with respect to the wall 32 upon the advance of the support element. The supporting rollers 33 and 34 are preferably arranged symmetrically on both sides of the packing 37. They are furthermore constructed in such a manner that they are adjustable in order to center the sealing element in the cylindrical lock channel. For this purpose there is provided on the inside of a piston ring 25 in each case a mounting strap 39 (FIG. 7) in which corresponding mounting elements for the supporting rollers 33 and 34 are screwed and secured by nuts 40, 41 and 42. Spring plates 35 located directly below a holding strap 39 permit an adjustable tensioning of the support rollers 33 and 4.

An example of the continuous charging of the work chamber of an electron beam welding machine and of the simultaneous continuous removal of completely machined workpieces from said chamber with the use of a pressure lock system constructed in accordance with the invention, will now be described in further detail with reference to FIGS. 8 and 9.

The entire plant which is shown schematically consists essentially of a plurality of individual pipe lengths 47–54 joined hermetically to each other at their ends. At their entrance end, still outside the pressure lock system, there is a hydraulic cylinder 67 which is arranged in front of a loading table 65, by means of which a support element 44 loaded with a workpiece and placed on the loading table 65 can be introduced into the first pipe length 47 of the system. The said pipe length together with the adjoining pipe length 48 forms a part of the system which on the one hand effects the precentering of the support elements to be introduced one after another, while on the other hand, in cooperation with the additionally provided drive means of a conveyor device, it permits a continuous or stepwise advancing of the inserted support elements into the inlet lock channel of the pressure lock system.

The said drive means arranged in the region of the pipe lengths 47 and 48 consist of a positively synchronized double belt drive, the assemblies 45 and 46 of which, together with the corresponding drive elements, are arranged on opposite sides of the pipe circumferences of the pipe lengths 47 and 48. As special drive elements endless drive belts 69 and 70 are used, each passing over two guide rollers, said belts each having four transport dogs 68 which engage through slots provided on both sides in the corresponding cylindrical surface of the pipe lengths 47 and 48 and carry the piston-shaped sealing elements of the support elements along with them.

The pipe lengths 49 and 50 which follow in the direction of conveyance represent the inlet lock channel, which in this case operates in two stages. Through this inlet lock channel the support elements are introduced stepwise or preferably continuously into work chambers 51 and 52 of the electron-beam welding machine, which chambers are arranged one after the other and are also of cylindrical construction. These work chambers, in each of which, for instance, there can be produced an operating pressure of $10^{-2}$ mmHg, are in their turn each equipped with two electron-beam guns 63a, 63b and 64a, 64b by means of which two parallel extending seam welds can be effected one after the other on a workpiece lying on a support element during its preferably continuous advance.

In this connection it is merely necessary that the support element be turned automatically 90° between the work chambers 51 and 52 without the continuous operation being interrupted.

The completely machined workpieces resting in the mounts or clamping elements of the support elements thereupon pass through the outlet lock channel which adjoins the work chamber 52 and which in this case also operates in two stages and consists of the lock elements 53 and 54 the evacuatability of which is approximately the reverse of that in the inlet lock channel of the pressure lock system. Finally, the support elements arrive at an outlet discharge table 66 on which the support element coming from the locking element 54 is deposited for the removal of the workpiece.

The vacuum pump units connected with the individual lock elements and the work chambers of the system are designated 55 to 60 in FIG. 9.

For the continuous return to the loading table 65 of the support elements which have been deposited on the discharge table 66 and emptied there is provided a ring-shaped conveyor path 61 which may consist, for instance, essentially of an overhead rail with a number of hanger devices for carrying the support elements. A support element which is just being moved on the ring-shaped conveyor path is shown, designated 62, in FIG. 9.

Other embodiments are possible without going beyond the scope of the invention.

I claim as my invention:

1. A pressure lock system for the introduction into, and removal of workpieces from a high vacuum work chamber within which work may be performed on the workpieces, comprising an inlet lock channel and an outlet lock channel, each of which is in communication with the interior of said work chamber, a plurality of sealing elements having an outer peripheral shape conforming to the profile of the interior peripheral area of said lock channels and being in sealing relationship therewith around their entire outer peripheries, means for connecting adjacent sealing elements to one another to form a chain, said sealing elements being held in spaced relation, said means for connecting adjacent sealing elements to one another comprising a rigid intermediate element connected to opposed faces of adjacent sealing elements, said rigid intermediate elements being adapted for supporting said workpieces, means for feeding the chain of successive sealing elements and their respective intermediate elements into said inlet lock channel, and through said inlet lock channel, said working chamber and said outlet lock channel, and a plurality of vacuum pumps communicating with said inlet lock channel, said work chamber and said outlet lock channel through passageways connected to said inlet lock channel, said work chamber and said outlet lock channel, respectively, at spaced points, the dimension in axial direction of each said outer peripheries of said sealing elements being such that it is greater than the largest diameter of a passageway of said vacuum pumps communicating with said inlet lock channel and said outlet lock channel, respectively, and the distance in axial direction between two successive passageways being greater than the distance in axial direction between the outer peripheries of two ad-jacent sealing elements.

2. A pressure lock system according to claim 1 in which said chain of sealing elements includes a sufficient number of sealing elements to permit at least two spaced sealing elements to be located within said inlet lock channel, and at least two sealing elements to be located within said outlet lock channel.

3. A pressure lock system according to claim 1 in which said intermediate elements include adjustable clamping means for holding the workpieces.

4. A pressure lock system according to claim 1 in which said intermediate members are cup shaped to receive waste material produced by the work on the workpiece.

5. A pressure lock system according to claim 1 in which the interior surfaces of said inlet lock channel and of said outlet lock channel are cylindrical, and in which the said sealing elements are in the form of cylindrical pistons.

6. A pressure lock system according to claim 5 in which said cylindrical pistons are provided with annular packings.

7. A pressure lock system according to claim 1 in which said means for connecting adjacent sealing elements to one another comprises a member mounted on one face of a sealing member, and means for detachably connecting said member to the opposed face of the next adjacent sealing member, whereby selected sealing members may be separated from the chain.

8. A pressure lock system according to claim 7 in which said means for detachably connecting said intermediate member to the opposed face of the next adjacent sealing member comprises an electromagnetic clutch.

9. A pressure lock system according to claim 7 including a movable platform within said work chamber adapted to receive and support sealing members and their respective intermediate members which have been separated from the chain, said platform being mounted for linear movement on two horizontal axes and for rotating movement on a vertical axis.

10. A pressure lock system according to claim 1 in which each of said sealing elements is provided with supporting rollers, and means for adjusting said rollers to center the sealing elements in said lock channels.

11. A pressure lock system according to claim 10 in which said supporting rollers are resiliently mounted.

* * * * *